APPARATUS FOR MANUFACTURING RUBBER WASHER ELEMENTS

Filed Sept. 25, 1970

INVENTOR.
HAROLD E. HALL

BY

Meyer, Tilberry & Body

ATTORNEYS.

United States Patent Office 3,719,443
Patented Mar. 6, 1973

1

3,719,443

APPARATUS FOR MANUFACTURING RUBBER WASHER ELEMENTS

Harold E. Hall, Middlefield, Ohio, assignor to Stalwart Rubber Company, Bedford, Ohio
Filed Sept. 25, 1970, Ser. No. 75,452
Int. Cl. B29h 3/00
U.S. Cl. 425—352 7 Claims

ABSTRACT OF THE DISCLOSURE

A method and apparatus for manufacturing annular shaped rubber washer elements wherein an uncured elongated annular rubber blank is placed between a pair of coaxial mandrels which define an open-ended annular chamber having cross-sectional dimensions equal to those desired in the finished washer elements. Piston means disposed at each end of the chamber for coaxial movement into and out of the chamber apply pressure against the end portions of the blank in order to longitudinally compress and radially expand the blank into the final desired dimensional configuration while it is being cured. Following curing, the elongated element is cut transversely to its longitudinal axis in desired widths to form washer elements.

This invention pertains to the art of rubber manufacturing and more particularly to manufacturing elongated annular rubber elements.

The invention is particularly applicable to the manufacture of rubber washers and will be described with particular reference thereto; however, it will be appreciated that the invention has broader applications and may be applied in other environments where it is desired to form an elongated rubber element having predetermined desired inside and outside diameters.

Rubber washers have heretofore been manufactured by providing a cylindrical tube mandrel having an outer diameter corresponding to the inner diameter of the washer itself, wrapping the tube with uncured rubber to a point where the outside diameter is greater than that desired in the final washer, spirally wrapping the rubber with a cloth tape and placing the entire assembly in a curing oven until the rubber is vulcanized. Following vulcanization, the cloth tape wrapping is removed and the excess rubber on the outer periphery is ground off in order to reduce the outer diameter to that desired in the washers themselves. These tubes are then cut in any desired widths transverse to the tube longitudinal axis in order to form rubber washer elements.

This type of process has proved to be unsatisfactory in that substantial labor and material wastes are incurred therewith. By using the prior methods of manufacture, approximately two inches of length on each end of the tube are unusable and are necessarily scrapped. Additional material losses are incurred when the outside diameters of the tubes are ground down to the desired size. Because of the necessity for wrapping the mandrel with rubber and cloth tape, the human labor factor is an important factor in the manufacture of quality tube elements. This not only creates an uncertain quality variance factor, but also adds cost. Another problem encountered with prior methods is that they do not permit the density of the rubber elements to be varied so as to allow the elements to be manufactured with predetermined variable densities and resilient characteristics.

The present invention contemplates an improved method and apparatus for making rubber washer elements which overcome all of the above mentioned problems and others, and provides a method and apparatus for manu-

2 facturing rubber washer elements which is relatively simple, inexpensive and requires less material in order to make the final product.

In accordance with the present invention, an apparatus for manufacturing an elongated rubber element is provided which includes first and second coaxially disposed mandrels which establish an elongated open-ended chamber. An uncured elongated annular rubber blank is placed in the chamber area. Means for applying a force longitudinally against the end portions of the blank are disposed in each end of the chamber for coaxial movement towards the center thereof. The entire assembly is placed in a heated pressure vessel where the blank is cured, while at the same time, the pressure in the vessel itself acts to direct the force applying means inwardly towards the center of the chamber against the ends of the blank to longitudinally compress and radially expand it into the final desired dimensional configuration defined by the chamber. The cured blank is then removed from the pressure vessel and chamber area to be transversely cut into washer elements.

In accordance with a more limited aspect of the present invention, spacer elements having cross-sectional dimensions substantially equal with those of the chamber area are included at the ends of the rubber blank so as to accurately maintain the mandrels in the desired spaced-apart relationship and function as the means for applying a force to the ends of the rubber blank.

In accordance with yet another aspect of the present invention, a method of manufacture for elongated rubber elements having predetermined desired inside and outside dimensions is provided comprising the steps of:

(a) Placing an uncured elongated rubber blank member into an open-ended elongated chamber having a predetermined cross-sectional dimension defined by at least one elongated mandrel;

(b) causing a force to be applied to the blank from at least one end of and coextensive with the chamber against the blank whereby the blank is longitudinally compressed and radially expanded into a predetermined desired dimensional configuration; and, (c) Heating the chamber in order that the blank will be cured and permanently assume the predetermined desired dimensions.

The principal object of the present invention is the provision of a method and apparatus for the manufacture of elongated rubber elements.

Another object of the present invention is the provision of a method and apparatus for manufacturing elongated rubber elements for use in making rubber washers to provide increased production outputs.

Another object of the present invention is the provision of a method and apparatus for the manufacture of elongated rubber elements in which the amount of scrap material produced during manufacture is substantially reduced.

Yet another object of the present invention is the provision of a method and apparatus for the manufacture of elongated rubber elements in which the density of the finished elements is increased.

The invention may take physical form in certain parts and arrangements of parts, a preferred embodiment of which will be described in detail in this specification and illustrated in the accompanying drawings which form a part hereof and wherein.

Figure 1:
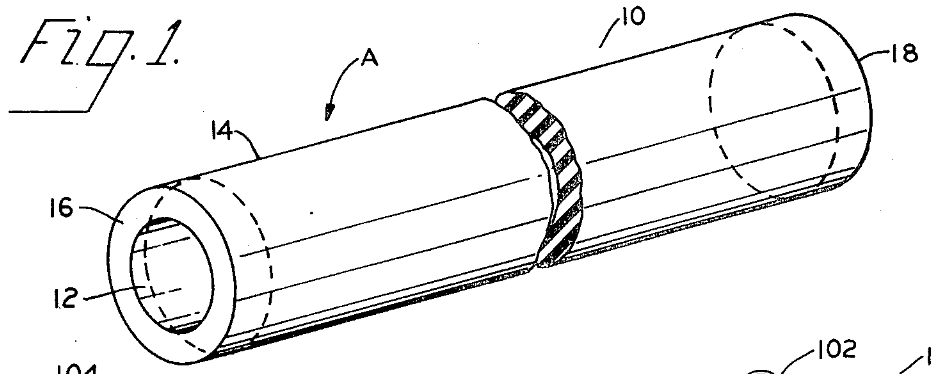
FIG. 1 is a pictorial view of the elongated rubber element which is manufactured by the apparatus and method of the subject invention.

Referring now to the drawings wherein the showings are for the purposes of illustrating the preferred embodiment of the invention only and not for purposes of limiting same, the figures show an elongated rubber element A which has been formed in accordance with the present invention, a heated pressure vessel or steam autoclave B which is utilized in curing rubber elements A and mandrel assembly C which establishes the chamber area to provide the final desired shape for rubber element A during manufacture.

Figures 3, 4:
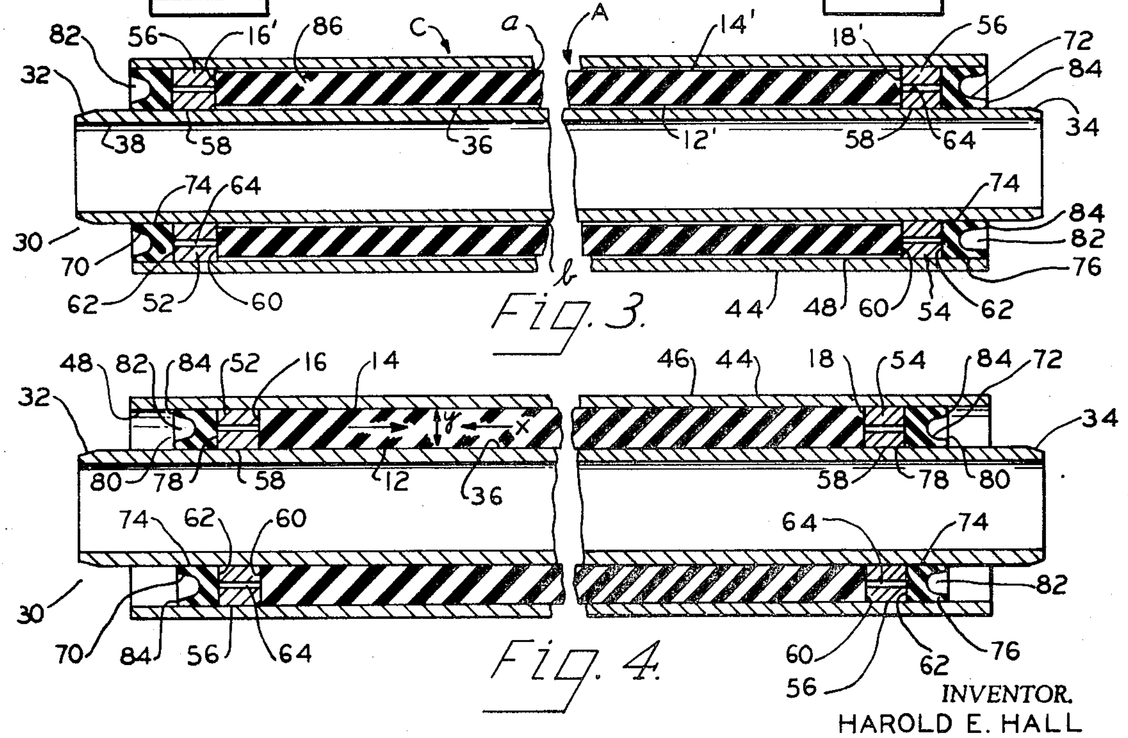
FIG. 3 shows the apparatus of the subject invention with rubber blank in position prior to curing.
FIG. 4 shows the apparatus of the subject invention with rubber blank shown in position during curing.

More specifically, the elongated rubber element of the subject invention is generally designated 10 in the figures and particularly in FIG. 1 shown as having inner peripheral surface 12, outer peripheral surface 14 and end face portions 16, 18. In FIGS. 3 and 4 which show the apparatus for making an elongated rubber element in accordance with the subject invention, a first or internal cylindrical mandrel is provided to include conical lead-in areas 32, 34, outer peripheral surface 36 and inner peripheral surface 38. It is not necessary to the invention that mandrel 30 be hollow as shown in FIGS. 3 and 4 and could merely comprise a solid elongated shaft. Mandrel 30 may be made from any material which has a relatively high melting temperature such as for example, and as used in the preferred embodiment, seamless steel tubing polished on outer peripheral surface 36. Mandrel 30 has an outside diameter equal to the desired final inside diameter of elongated rubber element 10.

Second or external cylindrical mandrel 44 is shown in the figures as surrounding first mandrel 30 and includes outer peripheral surface 46 and inner peripheral surface 48. Mandrel 44 may be constructed of similar material as mandrel 30, and in the preferred embodiment is seamless steel tubing. Inner peripheral surface 48 is polished so as to present a smooth sliding surface and the inside diameter is such so as to equal to the desired outside diameter of elongated rubber element 10.

Annular spacer elements generally designated 52, 54 are received between first mandrel 30 and second mandrel 44. Each spacer 52, 54 includes outer peripheral surface 56, inner peripheral surface 58, inner face portion 60 and outer face portion 62. These spacers may be constructed from materials such as steel, brass or aluminum and surfaces 56, 58 are polished to present more satisfactory sliding relationship with surfaces 36, 48. The diameters of annular spacers 52, 54 are such as to maintain mandrels 30, 44 in desired coaxial spaced relationship and have a sliding relationship therewith in order that rubber element 10 will be manufactured to include the predetermined desired dimensions. It has been found that for best results the outside diameter of spacers 52, 54 should be approximately .014 of an inch less than the inside diameter of second mandrel 44 and the inside diameter of the spacers is approximately .008 of an inch greater than the outside diameter of first mandrel 30. These clearances are based upon the use of a first mandrel having an outside diameter of about one and a quarter inches and a second mandrel having an inside diameter of about two inches. Further, each spacer includes a plurality of axially extending gas escape passages 64 which permit gases entrapped in the chamber to escape therefrom. With the installation of spacers 52, 54 between mandrels 30, 44, a "closed" chamber area is formed by surface 36, surface 48 and inner face portions 60.

Annular seals 70, 72 constructed in the preferred embodiment from silicone rubber, are employed to maintain spacers 52, 54 in position between mandrels 30, 44 in order to permit a pressure to build up from either end of the chamber and to also prevent air pressure build-up inside the chamber. Each seal includes inner peripheral surface 74, outer peripheral surface 76, inner face portion 78 and outer face portion 80. Outer face portion 80 includes a generally U-shaped circumferentially extending groove therein having groove lips 84 in communication with surfaces 36, 48.

In order to maufacture the desired elongated rubber element, an elongated rubber blank 86 is first placed over first mandrel 30. In FIG. 3, blank is shown as being longer than the final desired rubber element, having an outside diameter of less than the outer diameter of the final rubber element and having an inner diameter larger than the inner diameter of the final element. Surfaces 12′, 14′, 16′ and 18′ of the blank generally correspond to surfaces 12, 14, 16 and 18 of element 10. It has been found that the outer diameter of blank 86 is most advantageously between .030 to .040 of an inch less than the final desired diameter and that the inside diameter is up to 0.30 of an inch greater than the final desired element inside diameter. These diameter differentials merely facilitate ease of assembly of the subject apparatus and is not important to the apparatus and method of the subject invention. Second mandrel 44 is then placed over the first mandrel and blank generally coaxial therewith. Annular spacers 52, 54 are then inserted between the first and second mandrels as shown in FIG. 3 with inner faces 60 abutting end faces 16′, 18′ of the blank. Peripheral surfaces 56, 58 are closely slideably received in communication with polished surfaces 48, 36 respectively as hereinbefore described.

Next, annular seals 70, 72 are placed adjacent spacers 52, 54 respectively so that faces 62, 78 abut and inner and outer peripheral surfaces 74, 76, and in particular lips 84, are located in sliding communication with outer peripheral surface 36 and inner peripheral surface 48. Having thus described the apparatus shown in FIG. 3, it will be seen that there is provided a "closed" chamber area with an uncured rubber blank confined therein. Gaps designated *a* and *b* are present due to the oversized inside diameter and undersized outside diameter of the rubber blank 86.

Figure 2:
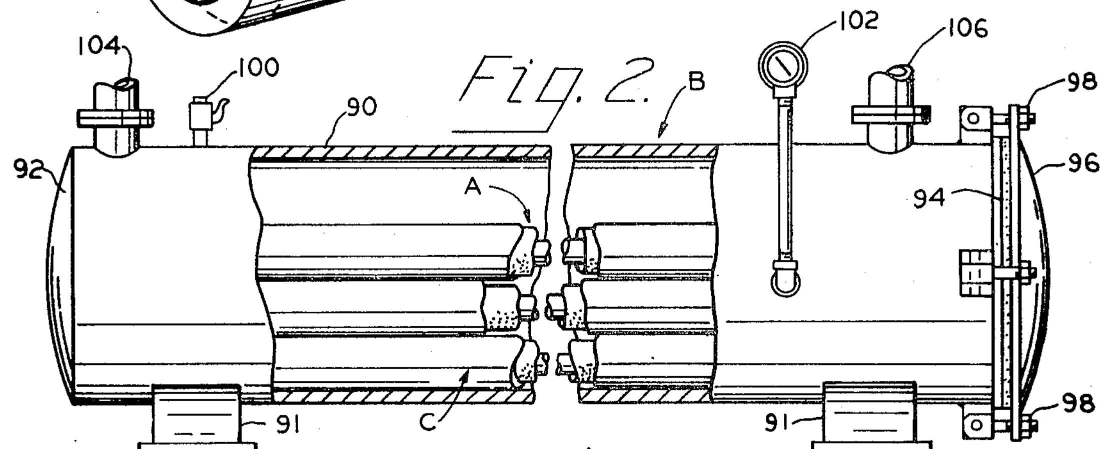
FIG. 2 shows the apparatus of the subject invention in a curing environment.

A plurality of these prepared chambers may be placed in a heated pressure vessel such as the steam autoclave shown in FIG. 2. The autoclave of FIG. 2 includes a body portion 90, leg members 91, closed end 92 and open end 94. Open end 94 includes a covering door 96 therefor which may be sealingly clamped to body portion 90 by means of clamp assemblies 98. The autoclave also includes pressure safety valve 100, pressure and temperature gages 102 and steam pressure inlet-exit conduits 104, 106. The chambers are positioned to extend longitudinally in body 90 by mounting brackets which are not shown and do not form a part of this invention. Once the chambers are in position and the autoclave sealed, the operation of the autoclave may begin. To cure the blanks a temperature inside the autoclave of 250° F. or above is most desirous. The pressure, which may be varied, is most advantageously maintained between 50 and 75 pounds per square inch. It will be appreciated that the pressure in the autoclave acts against the slideable seals 70, 72 and spacers 52, 54 to direct them inwardly towards the center of their associated chamber. The result of this pressure is to longitudinally compress blank 86 in the direction designated *x* in FIG. 4 while radially expanding the initial wall thickness in the direction of *y* until surfaces 12′ 14′ meet surfaces 36, 48 of the mandrels. The longitudinal compression continues until the resistance presented by the compressed blank equalizes the pressure in the autoclave. Therefore, by varying the pressure in the autoclave, the density of the final tube element 10 may be varied. Using the above described condition, a blank 86 having an original length of 25 inches is compressed to an element having a length of approximately 21½ inches.

Following curing, the autoclave is opened and the individual chambers are removed and disassembled in order to retrieve the elongated rubber elements 10. It is then only necesary to remove approximately one quarter of an inch of length from each end face portion 16, 18 since approximately only this amount of length is rendered scrap by using the method and apparatus of the subject invention. Following this, the remaining length of elongated rubber element 10 may be transversely sliced by a saw or cutter into various thicknesses so as to produce rubber washer elements.

The subject method and apparatus for manufacturing elongated rubber elements presents substantial manufacturing and material cost savings. For example, prior methods required approximately two inches be removed from the length of the element at each end and that one-eighth inch be removed from the overall outside diameter. This material was necessarily scrapped. As a further example, 3825 pounds of rubber material were required for each 100,000 pieces of predetermined size using prior methods whereas only 2750 pounds were required for an identical 100,000 pieces using the subject invention. This represents a 28% savings in raw material. Using prior methods, and based on the same 100,00 pieces, the factory costs were reduced 29%.

It is to be understood that the above described preferred embodiment of the invention may be modified so as to eliminate the necessity for employing a heated pressure vessel. For example, annular spacers 50, 54 and annular seals 70, 72 could easily be interconnected to mechanically driven pistons so that they may be directed into and out of communication with the chamber area. The external mandrel 44 could then be mounted in desired association with the pistons and adjacent a heater element, such as for example a gas heater. The heater would supply heat uniformly so as to cure rubber blank 86 while at the same time, the pistons would be mechanically actuated to longitudinally compress and radially expand the blank element to whatever degree desired.

The invention has been described with reference to the preferred embodiment. Obviously, modifications and alterations will occur to others upon the reading and understanding of this specification. It is my intention to include all such modifications and alterations in so far as they come within the scope of the appended claims or the equivalence thereof.

Having thus described my invention, I now claim:

1. An apparatus for manufacturing an elongated rubber element having a longitudinal axis from an uncured rubber blank so as to have predetermined desired final length and cross sectional dimensions, said apparatus comprising:

at least one means for establishing an elongated open ended chamber having a length at least equal to the length of said blank and a cross sectional dimension substantially equal to said final desired cross sectional dimension, said chamber establishing means comprising first and second coaxial mandrels, said first mandrel defining the internal wall of said chamber and said second mandrel defining the external wall of said chamber;

means for selectively closing the ends of said chamber;

means for forcefully moving at least one of said closing means from a first position in said chamber to a second position in said chamber toward the other of said closing means to confine said blank under pressure in said chamber betwen said closing means to have substantially final desired length and cross sectional dimensions; and means for curing said rubber blank as it is retained in said confined condition.

2. The apparatus as defined in claim 1 wherein said closing means comprises spacer means for maintaining said first and second mandrel means in exact spaced apart relationship to facilitate dimensional continuity of the walls of said chamber.

3. The apparatus as defined in claim 2 wherein said spacer means comprise annular elements adapted to be received transversely between said first and second mandrels, said annular elements further including means for venting gases from said chamber area.

4. The apparatus of claim 3 wherein said means for venting comprises a plurality of orifices extending axially through said annular elements.

5. The apparatus as defined in claim 3 further including a sealing element adjacent each said annular element on the opposite side thereof from said blank and generally dimensionally coextensive therewith, said sealing elements including a first sealing lip in communication with said internal wall of said chamber and a second sealing lip in communication with said external wall of said chamber.

6. The apparatus as defined in claim 5 wherein said annular elements and associated annular seals are coaxially movable into and out of said chamber such that confining pressure may be applied to both ends of said blank.

7. The apparatus as defined in claim 1 wherein said means for forcefully moving and said means for curing comprise the pressure and temperature developed by placing said apparatus in a closed pressure vessel.

References Cited

UNITED STATES PATENTS

| | | | |
|---|---|---|---|
| 3,374,501 | 3/1968 | Newhall | 18—5 H X |
| 1,812,282 | 6/1931 | Blaker | 18—6 R X |
| 2,698,458 | 1/1955 | Keach | 18—6 R |
| 2,408,630 | 10/1946 | Green | 425—352 |

J. SPENCER OVERHOLSER, Primary Examiner

D. W. JONES, Assistant Examiner

U.S. Cl. X.R.

10—73; 249—146; 264—322; 425—392